US012723427B2

(12) United States Patent
Nevin

(10) Patent No.: US 12,723,427 B2
(45) Date of Patent: Sep. 1, 2026

(54) MOBILE UMBRELLA BASE

(71) Applicant: Michael Patrick Nevin, Constantia (ZA)

(72) Inventor: Michael Patrick Nevin, Constantia (ZA)

( * ) Notice: Subject to any disclaimer, the term of this patent is extended or adjusted under 35 U.S.C. 154(b) by 57 days.

(21) Appl. No.: 18/875,265

(22) PCT Filed: Jun. 22, 2023

(86) PCT No.: PCT/IB2023/056480
§ 371 (c)(1),
(2) Date: Dec. 16, 2024

(87) PCT Pub. No.: WO2023/248188
PCT Pub. Date: Dec. 28, 2023

(65) Prior Publication Data

US 2026/0015883 A1 Jan. 15, 2026

(30) Foreign Application Priority Data

Jun. 22, 2022 (ZA) ................................ 2022/06906

(51) Int. Cl.
*E04H 12/22* (2006.01)
*A45B 23/00* (2006.01)
*F16M 11/42* (2006.01)

(52) U.S. Cl.
CPC ......... *E04H 12/2238* (2013.01); *A45B 23/00* (2013.01); *F16M 11/42* (2013.01); *A45B 2023/0031* (2013.01); *E04H 12/2261* (2013.01); *F16M 2200/08* (2013.01)

(58) Field of Classification Search
CPC ........... E04H 12/2238; E04H 12/2261; E04H 12/2246; A45B 23/00; A45B 2023/0031; A45B 2023/0043; F16M 11/42; F16M 2200/08
USPC .................................................. 248/519, 522
See application file for complete search history.

(56) References Cited

U.S. PATENT DOCUMENTS 4,000,750 A * 1/1977 Becher .................... E04H 15/28 135/20.3
6,305,659 B1 * 10/2001 Metelski ................ A61B 90/25 248/910
6,594,951 B1 * 7/2003 Reynolds ............... A47G 7/041 47/39

(Continued)

FOREIGN PATENT DOCUMENTS

FR 3016181 7/2015

OTHER PUBLICATIONS

International Preliminary Report on Patentability Dated Sep. 5, 2024 From the International Preliminary Examining Authority Re. Application No. PCT/IB2023/056480. (3 Pages).

(Continued)

*Primary Examiner* — Muhammad Ijaz

(57) ABSTRACT

The invention is for an umbrella base (10) that is transported in a flat pack and is assembled by attaching two brace elements (22) to end plate assemblies (22) to form a frame and then loading store-bought slabs (52) onto the frame to serve as ballast elements. The end plate assemblies (20) include castors (36) that provide mobility and the umbrella base (10) includes a deck (18), so that the ballast elements (52) are covered.

5 Claims, 6 Drawing Sheets

(56) References Cited

U.S. PATENT DOCUMENTS 8,632,045 B2 * 1/2014 Ma .......................... F16H 21/54 248/129
8,672,287 B2 * 3/2014 Li ....................... E04H 12/2238 248/521
8,851,093 B2 * 10/2014 Li .......................... F16M 13/02 135/912
8,899,249 B2 * 12/2014 Lai ......................... A45B 23/00 248/346.11
9,540,840 B2 * 1/2017 Ma ......................... F16M 13/00
10,813,425 B2 * 10/2020 Shen ................... E04H 12/2238
11,365,557 B2 * 6/2022 Ma ...................... E04H 12/2238
11,629,520 B1 * 4/2023 Geraghty ............... A45B 23/00 280/35
11,814,858 B2 * 11/2023 Luo ........................ A45B 23/00
12,007,065 B2 * 6/2024 Ma ...................... E04H 12/2238
2004/0056169 A1 * 3/2004 Harbaugh ........... E04H 12/2246 248/910
2004/0069922 A1 * 4/2004 Wu ..................... E04H 12/2246 248/519
2005/0189005 A1 * 9/2005 Smith ................. E04H 12/2246 135/16
2006/0103092 A1 * 5/2006 Strahler ................ B62B 5/0083 280/79.11
2007/0080277 A1 * 4/2007 Chen ................... E04H 12/2246 248/354.3
2008/0224016 A1 * 9/2008 Defu ................... E04H 12/2246 248/523
2008/0296463 A1 * 12/2008 Li ....................... E04H 12/2238 248/519
2010/0147341 A1 * 6/2010 Li ....................... E04H 12/2246 248/522
2011/0232704 A1 * 9/2011 Li .......................... A45B 25/14 248/522
2012/0024329 A1 * 2/2012 Ma ........................... F16M 7/00 280/30
2012/0024330 A1 * 2/2012 Ma ........................ B62B 5/0083 280/30
2012/0025050 A1 * 2/2012 Ma ...................... E04H 12/2238 74/532
2013/0146740 A1 * 6/2013 Ma ...................... E04H 12/2246 248/519
2014/0326851 A1 * 11/2014 De Leeuw .............. D06F 81/00 248/346.03
2016/0177591 A1 6/2016 Williams
2017/0114563 A1 * 4/2017 Ye .......................... A45B 23/00
2018/0049523 A1 * 2/2018 Zadie ...................... E04H 12/22
2018/0334828 A1 * 11/2018 Pan ..................... E04H 12/2246
2020/0208429 A1 * 7/2020 Ma ...................... E04H 12/2238
2021/0085075 A1 * 3/2021 Volin ..................... A47B 37/04
2021/0310269 A1 10/2021 Dinse
2021/0310603 A1 10/2021 Simon
2021/0321768 A1 * 10/2021 Hiorth .................. A47B 91/005
2025/0072985 A1 * 3/2025 Xi .......................... A61B 34/37
2025/0179830 A1 * 6/2025 Dickstein ............. A45B 25/165
2025/0320957 A1 * 10/2025 Browne .............. E04H 12/2246
2026/0015883 A1 * 1/2026 Nevin ................. E04H 12/2238

OTHER PUBLICATIONS

International Search Report and the Written Opinion Dated Sep. 27, 2023 From the International Searching Authority re. Application No. PCT/IB2023/056480. (7 Pages).

* cited by examiner

MOBILE UMBRELLA BASE

RELATED APPLICATIONS

This application is a National Phase of PCT Patent Application No. PCT/IB2023/056480 having International filing date of Jun. 22, 2023, which claims the benefit of priority of South Africa Patent Application No. 2022/06906 filed on Jun. 22, 2022. The contents of the above applications are all incorporated by reference as if fully set forth herein in their entirety.

FIELD AND BACKGROUND OF THE INVENTION

This invention relates to bases for umbrellas such as garden umbrellas and the like and more specifically, the invention relates to mobile bases for umbrellas.

While this invention is described and illustrated with reference to cantilever umbrellas with radial arms, it can be applied to all umbrella types.

There are many umbrella base types that are designed to satisfy the requirement of keeping the umbrella stable in an upright orientation. There are also several base types designed to provide mobility for the umbrella. These include pure-mass solutions such as a single concrete ballast through to lightweight steel frames that can be loaded-up with ballasts such as store-bought concrete paving slabs to provide ballast.

The benefits of the single concrete ballast option include that it is spatially efficient (i.e. it can be compact) and it can be mobile, but it holds the disadvantage that it is extremely costly and difficult to transport the heavy bases.

The benefit of the frame and store-bought ballast system is that it is easier and more cost-effective to transport a frame and purchase the ballast elements locally, closer to where the umbrella base will be used, but the disadvantages are that it is visually ungainly, difficult to mobilize and structurally inefficient to the extent that frame structures are designed with large footprints to provide strength and stability.

Currently available umbrella bases come in an array of configurations, from single ballast elements of various sizes and shapes to frame-like structures that require loose ballast elements. These umbrella bases provide varying degrees of structural stability, movability, space optimization, ease of delivery and neatness/aesthetic appeal, but they also hold several disadvantages, including:

The manufacturing technologies include complicated welded frame structures, expensive castings using high-tech materials or are crude concrete castings.

Heavy bases are difficult to handle and therefore expensive to deliver and require more than 1 person to assemble and move.

They are unsightly.

Frame-type structures have a large footprint.

Frame-type structures are structural inefficient.

These systems are mostly immobile and those that can be moved mostly require much effort.

The present invention seeks to provide an umbrella base that: is light and convenient to transport; can quickly and easily assembled on site; can accommodate ballast elements; occupies a small footprint; is highly mobile; and/or that is aesthetically sophisticated and attractive in its final assembled configuration.

SUMMARY OF THE INVENTION

According to the present invention there is provided an umbrella base comprising:

two end plate assemblies, each of said end plate assemblies including an elongate end plate with two opposing ends, two rotating castors that are attached to the end plate at its opposing ends, at least two brace attachment formations provided in the vicinities of the two opposing ends of the end plate, and deck attachment formations provided at a top edge of the end plate;

two elongate brace elements with opposing ends, one end of each of said brace elements being attachable to one of the brace attachment formations of one of the end plates, and the other end of each of said brace elements being attachable to the one of the brace attachment formations of the other of said end plates, so that the end plates are held in a spaced-apart configuration with the brace elements extending between them, and the brace elements are spaced apart, with a central zone defined between the spaced apart end plates and the spaced apart brace elements;

a plurality of seat protuberances that protrude inwardly towards the central zone from opposing sides of the central zone from at least two locations on the end plates and brace elements; and a deck that is attachable to the deck attachment formations of the end plates;

wherein the deck is disposed above the central zone and is spaced above the seat protuberances.

The umbrella base may include a ballast comprising at least one rectangular ballast element that is supported on the seat protuberances, below the deck.

The seat protuberances may be in the form of lips that protrude inwardly from lower edges of the brace elements, towards the central zone and each brace element may have an L-shaped cross-sectional profile comprising two flanges and one of said flanges on each brace element may serve as one of the seat formations.

The umbrella base may include a support formation on a top surface of the deck, said support formation being configured to receive a lower end of an umbrella post.

The umbrella base may be in a kit form wherein the end plate assemblies, the brace elements and the deck are loose from one another, and the end plate assemblies and brace elements are held in close proximity on one side of the deck.

The deck may have peripheral skirt formations that extend from a periphery of the deck towards an underside of the deck, and wherein said end plate assemblies and brace elements are at least partly surrounded by the skirt elements.

The invention extends to an umbrella assembly comprising the umbrella base described herein above and an umbrella with a post that is supported above the deck.

The umbrella may have an offset umbrella canopy.

BRIEF DESCRIPTION OF THE DRAWINGS

For a better understanding of the present invention, and to show how it may be carried into effect, the invention will now be described by way of non-limiting example, with reference to the accompanying drawings in which.

DETAILED DESCRIPTION OF THE DRAWINGS

Figure 1:
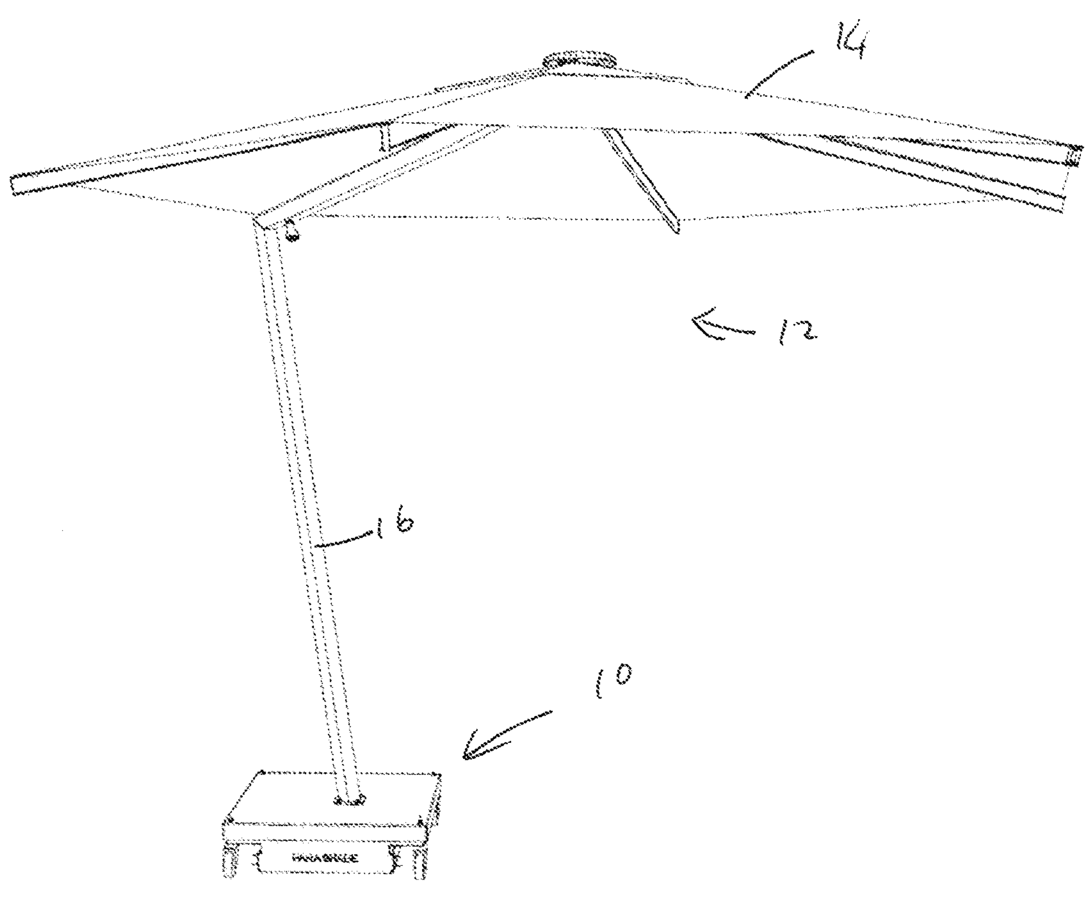
FIG. 1 shows a three-dimensional view of an umbrella and an umbrella base according to the present invention, in a fully assembled configuration.

Referring to the drawings, an umbrella base according to the present invention is identified, generally, by reference number 10 and an umbrella for use with the umbrella base is identified by reference number 12. The umbrella includes a canopy 14 and post 16.

The umbrella base 10 comprises a top plate or deck 18, two end plate assemblies 20, two brace elements 22 and ballast elements 24.

The deck 18 has a top surface 24 and an opposing underside 26 and a return flange or skirt 28 extends along a periphery of the deck 18 towards the underside. Threaded fixing points 30 which serve as support formations for supporting the umbrella post 16 and four oversized fixing holes 32 for attaching the deck 18 to the end plate assemblies 20.

The deck 18 is shown rectangular in the illustrated embodiment of the invention and this is a cost-effective and practical shape, but the deck can have different shapes. The deck 18 is preferably formed from steel plate or other suitable durable metal, but it can potentially be made of other durable material. The terms "top surface" and "underside" are used herein with reference to the normal, upright orientation of the umbrella base 10 in use.

Each end plate assembly 20 includes an elongate end plate 34 with two opposing ends, two rotating castors 36 that are attached to the end plate at its opposing ends. Each end plate 34 is preferably recessed at its ends to accommodate most of the castor in the recess. Next to each recess there is a brace attachment formation in the form of a vertical bracing tab 38 with threaded holes and along an upper edge of the end plate 34 there is a flange 40 with threaded holes, to serve as a deck attachment formation.

Each end plate 34 includes a central cover plate section 42 and at the top of each of the castor recesses 44 there is a castor support plate 46 that is parallel to the flange 40 and the castor 36 is supported by the support plate 46 at a fixing point.

The two brace elements 22 each comprises a vertical flange 50 which has, on each extremity, two threaded fixing points 52 that align with the two holes on the bracing flanges 38 of the end plate assemblies 22 for attaching the ends of the brace elements to the end plate assemblies. Each brace element 22 also has a horizontal flange 48 that protrudes inwardly when the brace element is attached to the end plate assemblies 20.

The end plates 34 and L-profiled brace elements 22 are preferably also formed from steel plate.

When the brace elements 22 are attached to the end plate assemblies 20, they form a rectangular frame with the brace elements spaced apart and the end plate assemblies spaced apart and a central zone between them. The horizontal flanges 48 of the brace elements 22 form seat elements that protrude inwards towards the central zone. In other embodiments of the invention, the frame could include more or differently configured seat elements that protrude inwards to the central zone, from the brace elements 22 and/or the end plate assemblies 20. When the deck 18 is attached to the frame, it is spaced above these seat elements.

The umbrella base 10 include a ballast comprising one or more ballast elements 52 that are preferably in the form of one or more rectangular concrete slabs-preferably of a standard size that is readily available at stores and preferably have standard sizes. In the illustrated embodiment, the ballast elements 52 are a combination of 200×400×40 and 400×400×40 concrete paving slabs. The ballast elements 52 are supported on the horizontal flanges 48 or other seat protuberances, below the deck 18.

DESCRIPTION OF THE INVENTION AS DESCRIBED BY THE DRAWINGS

The purpose of this invention is to provide a lightweight umbrella base that can be compactly and efficiently transported and delivered and once received, be easily assembled, including loaded with locally available, store-bought, paving slab ballast elements and, on completion provide a compact and visually appealing fully mobile umbrella base solution.

Figure 2:
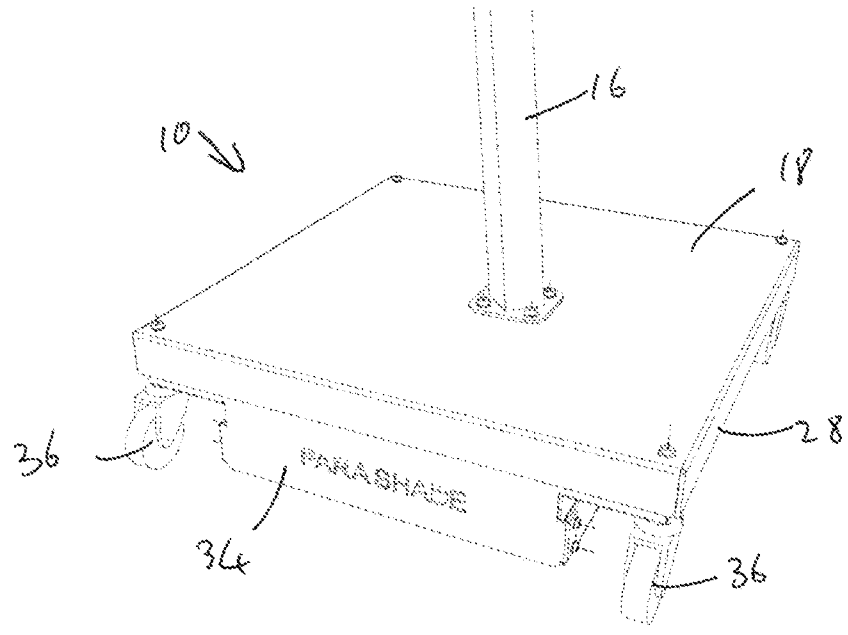
FIG. 2 shows a detail three-dimensional view of the umbrella base of FIG. 1.

This section describes the assembly process of the invention, as described by the drawings:

FIG. 1 shows a completed umbrella 01 comprising a canopy 02 on a post 03 that is connected to a base 04 as described by this invention FIG. 2 shows an umbrella post 03 on a base 04 as described by this invention with top plates 05, end plates 10 and bracing angles 21 visible.

Figure 3:
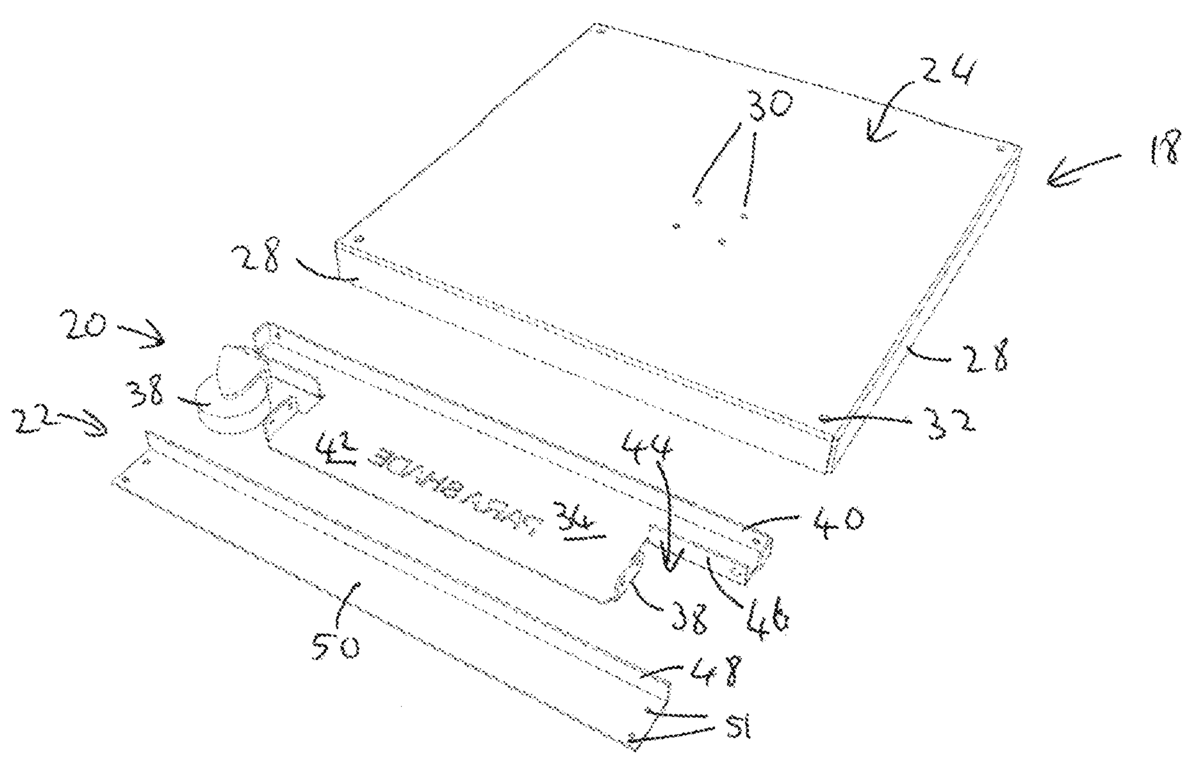
FIG. 3 shows a three-dimensional view of some component parts of the umbrella base of FIG. 1.

FIG. 3 illustrates the primary manufactured component elements of the flat-pack umbrella base including:

The top plate 05 comprising the showing the upper surface 06, return flanges 07, the threaded base fixing points 09 and the oversized fixing holes 08 for attaching this plate 05 to the end cover plates 10

The end plates 10 comprising the central cover plate 11 that hides the ballast stones 25 and provides stiffening to the assembly and the vertical carrier plate sections 12 protruding either side of the central cover plate portion 11. Projecting backward from these are the horizontal flange 13 with, at either extremity, a threaded fixing point 17 for attaching the top plate 5, castor support plates 14 each with fixing point 18 for the castors 20 and bracing flanges 15 each with two holes 19 for attaching the end plate 10 to the bracing angles 21.

The bracing angles 21 comprising a vertical flange 22 which has, on each extremity, two threaded fixing points 24 that align with the two holes 19 on the bracing flanges 15 of the cover plates 10 for attaching the same together and a horizontal flange 23 that provides stiffening and a platform for the store-bought ballast paving slabs 25.

Figure 4:
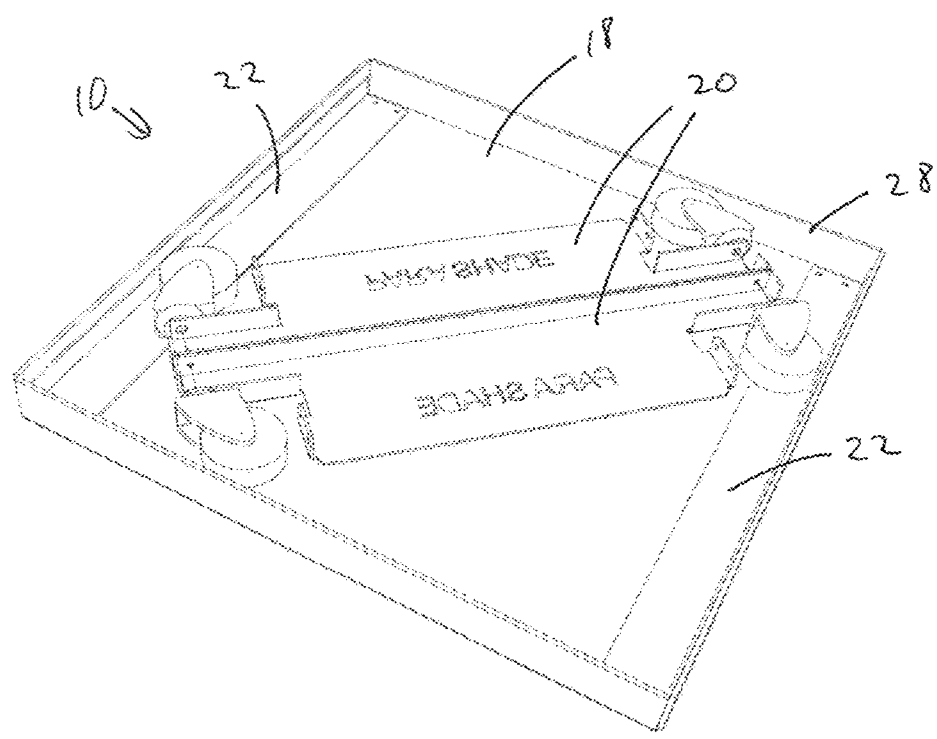
FIG. 4 shows a three-dimensional view of the component parts of the umbrella base of FIG. 1, that are used to form a frame and deck of the umbrella base, the component parts being shown in a compact flat-pack configuration.

FIG. 4 shows the flat-pack packaging configuration of the invention, with the top plate 05 upside-down and inside the top plate 05, the two end plates 10 complete with castors 20 as well as the two bracing angles 21. Also to be included are the necessary fixing and fastenings. This is the package that will arrive at the client, ready for assembly.

Figure 5:
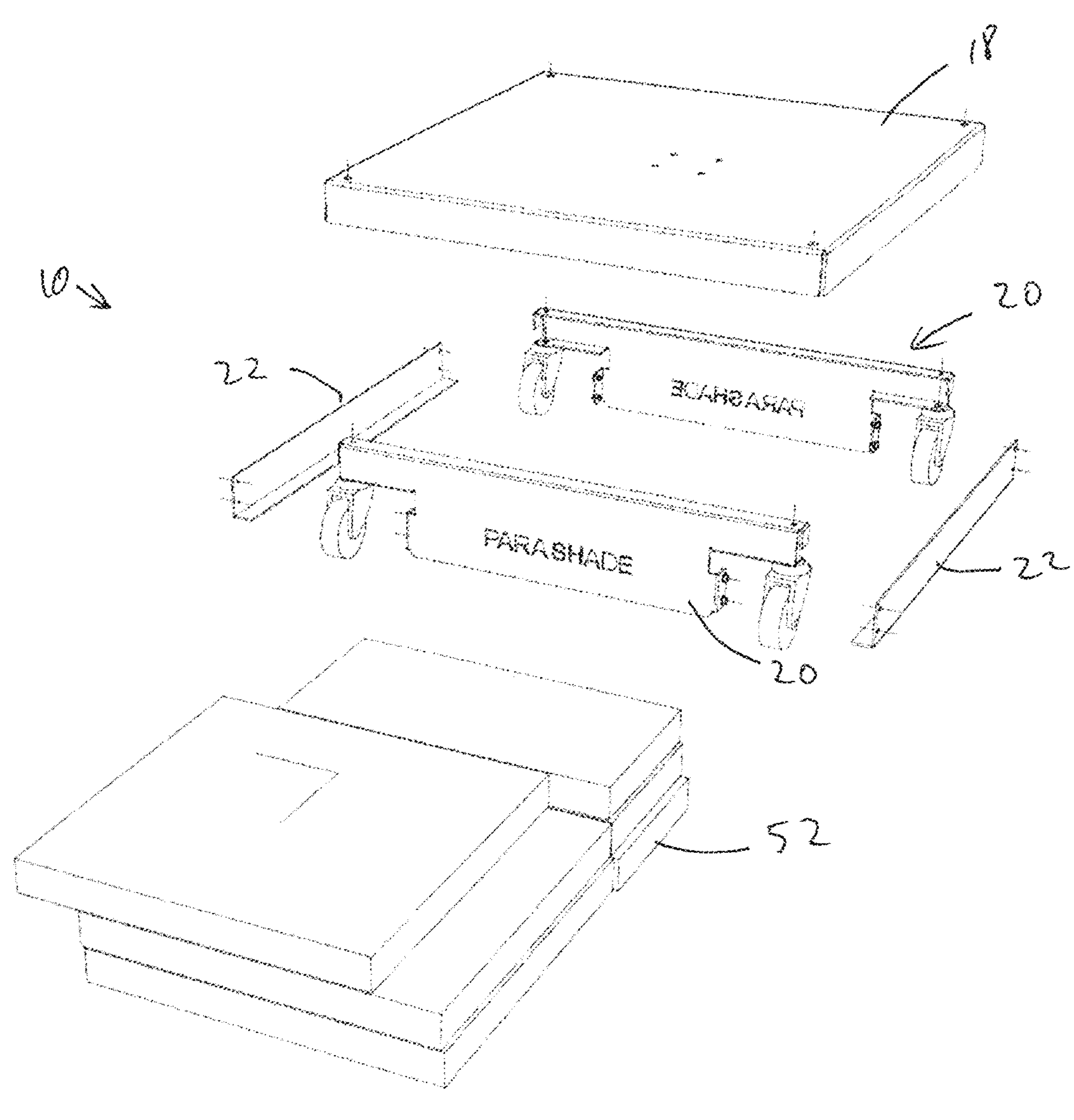
FIG. 5 shows an exploded three-dimensional view of the umbrella base of FIG. 1 in an unassembled configuration, including the frame, deck and store-bought ballast stones of the umbrella base.

FIG. 5 shows the components for the assembly of the base in exploded configuration with the store-bought ballast paving slabs 25, the end plates 10 shown in the upright position, the bracing angles 21 either side and the top plate 05 above.

Figure 6:
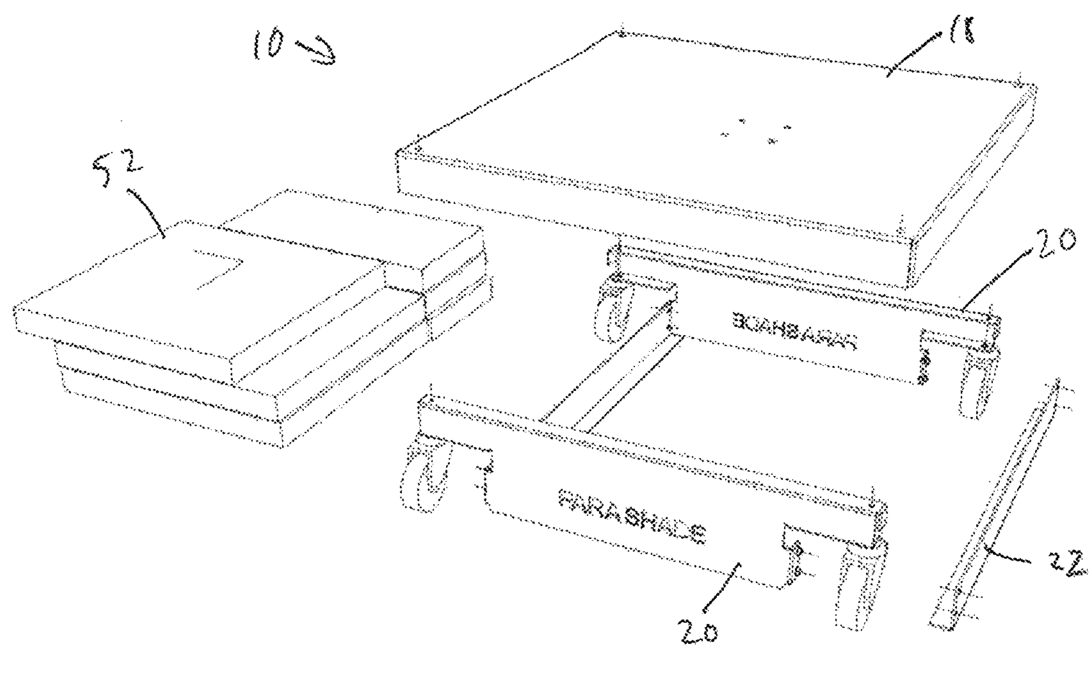
FIG. 6 shows a three-dimensional view of the umbrella base of FIG. 5 in a first partially assembled configuration, with bracing elements of the frame attached to end plates of the frame.

FIG. 6 shows the start of the assembly process, with the first bracing angle 21 in position for attaching it to the end plates 10. The holes 19 in the bracing flanges 15 of the end plate 10 are aligned with the threaded fixing points 24 in the bracing angles 21 and these are attached with bolts 26.

Figure 7:
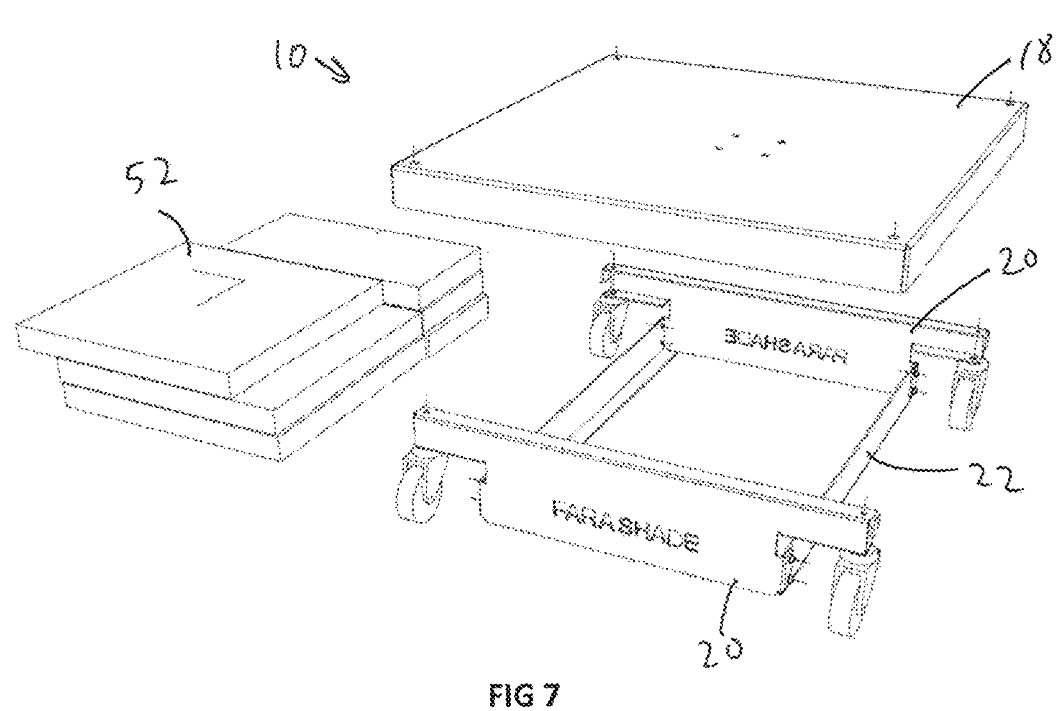
FIG. 7 shows a three-dimensional view of the umbrella based of FIG. 6 in a second partially assembled configuration, with the frame assembled prior to loading with the ballast stones.

FIG. 7 shows the second bracing angle 21 attached as per the description above.

Figure 8:
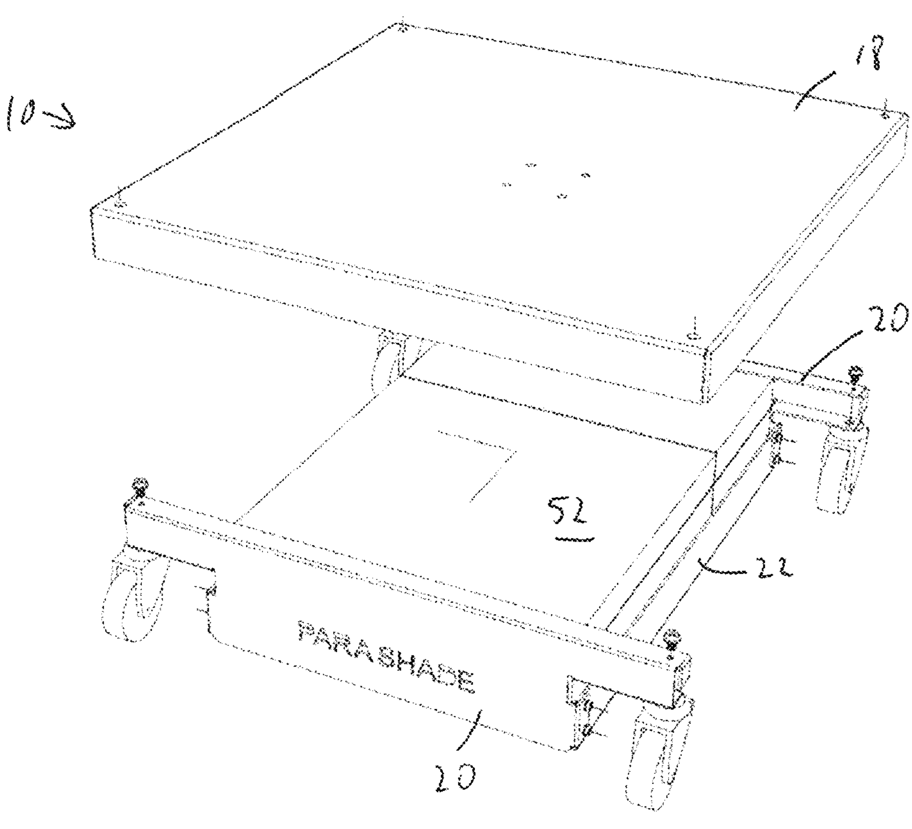
FIG. 8 shows a three-dimensional view of the umbrella base of FIG. 7 in a third partially assembled configuration, with the ballast stones loaded onto the frame.

FIG. 8 shows the store-bought paving slab ballast elements 25 loaded int the completed sub frame with the top plate 05 about to be attached.

Figure 9:
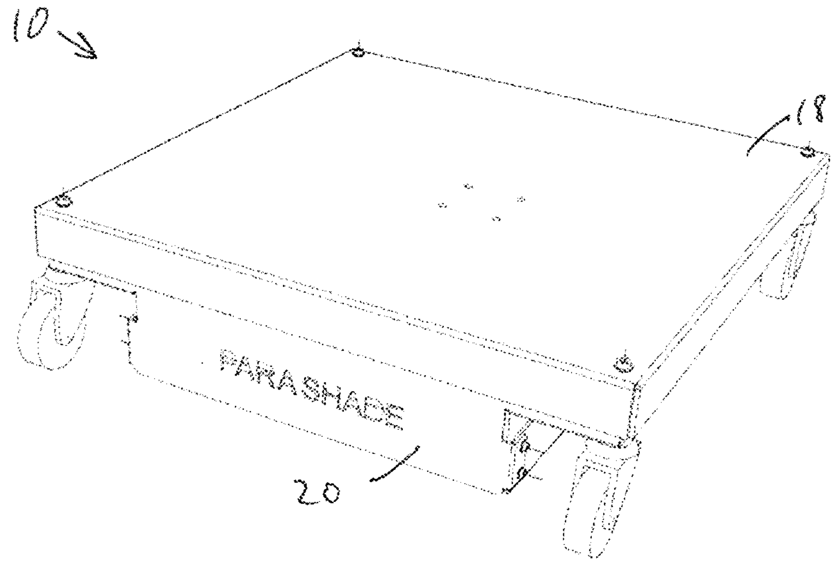
FIG. 9 shows a three-dimensional view of the umbrella base of FIG. 8 in a fully assembled configuration, with the deck in place.

FIG. 9 shows the top plate 05 in position and attached to the sub frame with bolts 26 through the oversized holes in the top plate 05 and secured into the threaded fixing points 17 on the end covers 10.

Figure 10:
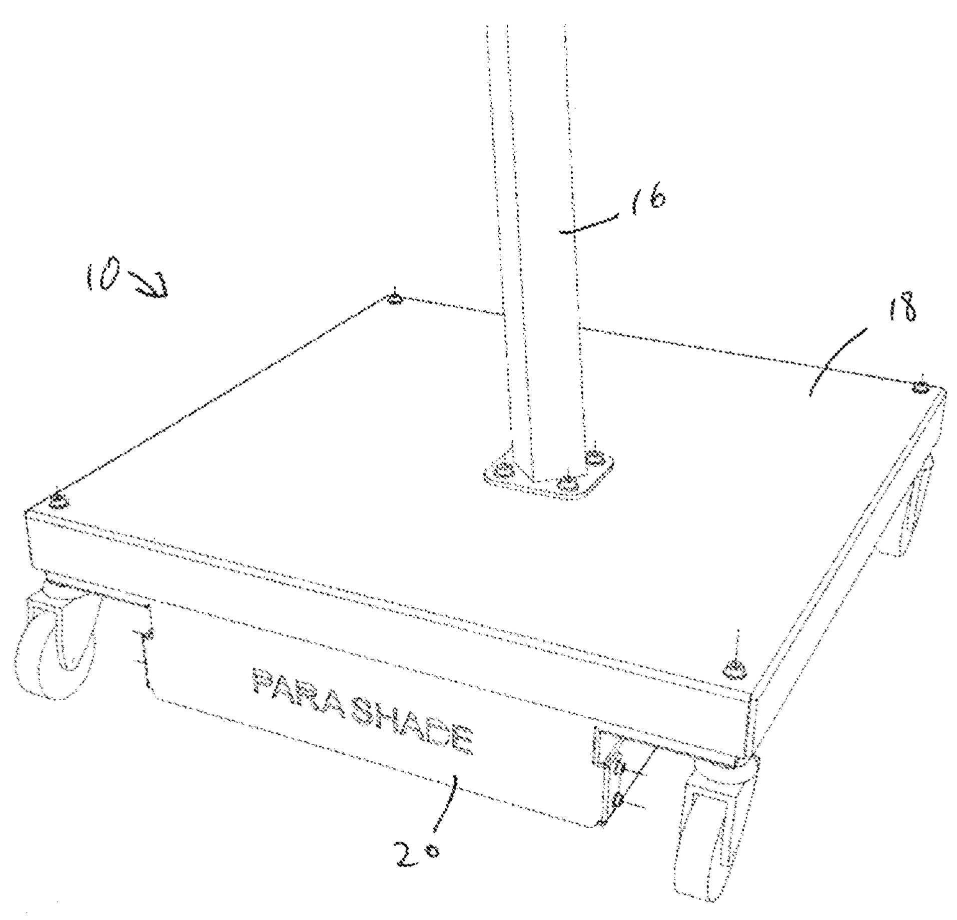
FIG. 10 shows a three-dimensional view of the fully assembled umbrella base of FIG. 9 with the umbrella attached to the umbrella base.

FIG. 10 shows the completed base with the umbrella post 03 secured to the top plate 05 with bolts 26 securely bolted into the threaded holes 08 in the top plate 05.

DESCRIPTION OF ASSEMBLY OF THE BASE

The base metal framing elements will arrive in a packaged flat pack form and include a top plate 05, two end plates 06 complete with castors 07, two bracing angles θ8 and the necessary fixings. To assemble the base:

Before assembling the base, it will be necessary to procure the correct size and number of locally available paving slabs 25 to provide ballast.

Step 1 is to attach the bracing angles 10 to the end plates 21 with all flanges facing inwards. The fixing holes 19 in the bracing flanges 15 on the end plates 10 are aligned with and securely fixed to the fixing points 24 in the end plate 21 bracing angles. The sub frame is now ready for loading with store-bought paving slabs 25.

Step 2 is to load the sub-frame with the store-bought paving slabs 25.

Step 3 is to position the top plate 05 and fix this to the end plates 10 through the oversized fixing point holes 08 in the corners of the upper surface 06. The fixings are secured through the holes 26 and into the fixing points 17 on the cover plate 10.

Step 4 is to attach the umbrella post 04 to the top plate by securing it into the post fixing points 09. In the instance of the invention this is represented by 4 fixing points, but this may vary.

Step 5 is to attach the umbrella canopy 02 onto the post 03.

The illustrated invention holds the following advantages:

This system is easy to manufacture with no welded parts.

It can be delivered in a compact box that can be carried by a single person.

It is easy to assemble by 1 person.

It is neat and attractive.

Provides a ridged and stable structure for the umbrella.

Once assembled, is easy to move as required.

In short, this invention is a high-tech, simple, easy to assemble base solution that is attractive and, extremely importantly, highly mobile.

The umbrella base may be in a kit form wherein the end plate assemblies, the brace elements and the deck are loose from one another, and the end plate assemblies and brace elements are held in close proximity on one side of the deck. The deck may have peripheral skirt formations that extend from a periphery of the deck towards an underside of the deck, and wherein said end plate assemblies and brace elements are at least partly surrounded by the skirt elements.

The invention extends to an umbrella assembly comprising the umbrella base described herein above and an umbrella with a post that is supported above the deck. The umbrella may have an offset umbrella canopy.

The invention claimed is:

1. An umbrella base comprising:

two end plate assemblies, each of said end plate assemblies including an elongate end plate with two opposing ends, two rotating castors that are attached to the end plate at its opposing ends, at least two brace attachment formations provided in the vicinities of the two opposing ends of the end plate, and deck attachment formations provided at a top edge of the end plate;

two elongate brace elements with opposing ends, one end of each of said brace elements being attachable to one of the brace attachment formations of one of the end plates with a threaded fastener, and the other end of each of said brace elements being attachable to the one of the brace attachment formations of the other of said end plates with a threaded fastener, so that the end plates are held in a spaced-apart configuration with the brace elements extending between them when the brace elements are attached to the attachment formations of the end plates, and the brace elements are spaced apart, with a central zone defined between the spaced apart end plates and the spaced apart brace elements when the brace elements are attached to the attachment formations of the end plates;

a plurality of seat protuberances that protrude inwardly towards the central zone from opposing sides of the central zone from at least two locations on the end plates and brace elements; and deck that is attachable to the deck attachment formations of the end plates with threaded fasteners such that;

wherein the deck is disposed above the central zone and is spaced above the seat protuberances when the deck is attached to the deck attachment formations;

wherein the umbrella base is in a kit form in which the end plate assemblies, the brace elements and the deck are loose from one another, and the end plate assemblies and brace elements are held in close proximity to an underside of the deck, wherein the deck has peripheral skirt formations that extend from a periphery of the deck towards the underside of the deck, said skirt formations extending at least partly around a cavity, and wherein said end plate assemblies and brace elements are stored in said cavity and are at least partly surrounded by the skirt elements when the umbrella base is in said kit form.

2. The umbrella base of claim 1, which includes a ballast comprising at least one rectangular ballast element that is supported on the seat protuberances, below the deck when the umbrella base has been assembled from its kit form.

3. The umbrella base of claim 1, wherein the seat protuberances are in the form of lips that protrude inwardly from lower edges of the brace elements, towards the central zone.

4. The umbrella base of claim 3, wherein each brace element has an L-shaped cross-sectional profile comprising two flanges and one of said flanges on each brace element serving as one of the seat formations.

5. The umbrella base of claim 1, which includes a support formation on a top surface of the deck, said support formation being configured to receive a lower end of an umbrella post.

* * * * *